United States Patent [19]

Talwar et al.

[11] Patent Number: 4,470,959
[45] Date of Patent: Sep. 11, 1984

[54] CONTINUOUS PRODUCTION OF SILICON TETRAFLUORIDE GAS IN A VERTICAL COLUMN

[75] Inventors: Jaidev S. Talwar, Morris County; James Hendrickson, Jr., Sussex County, both of N.J.

[73] Assignee: Allied Corporation, Morris Township, Morris County, N.J.

[21] Appl. No.: 505,620

[22] Filed: Jun. 20, 1983

[51] Int. Cl.³ .................................................. C01B 33/08
[52] U.S. Cl. ........................................................ 423/341
[58] Field of Search ............. 423/341; 261/113, 114 R

[56] References Cited

U.S. PATENT DOCUMENTS

| | | | |
|---|---|---|---|
| 2,813,008 | 11/1957 | Olson | 423/341 |
| 2,833,628 | 5/1958 | Molstad | 423/341 |
| 2,844,441 | 7/1958 | Pellin | 423/341 |
| 3,218,124 | 11/1965 | Oakley, Jr. et al. | 23/153 |
| 3,574,542 | 4/1971 | Hartig | 423/341 X |
| 3,645,678 | 2/1972 | Parish et al. | 423/341 |
| 3,645,679 | 2/1972 | Parish et al. | 423/341 |
| 3,645,680 | 2/1972 | Parish et al. | 423/341 |
| 3,674,431 | 7/1972 | Driscoll et al. | 423/341 |
| 3,969,485 | 7/1976 | Flemmert | 423/337 |
| 4,008,130 | 2/1977 | Leathers et al. | 203/6 |
| 4,062,930 | 12/1977 | Zawadzki et al. | 423/483 |
| 4,374,111 | 2/1988 | Lefrancois | 423/347 |

FOREIGN PATENT DOCUMENTS

| | | | |
|---|---|---|---|
| 215959 | 7/1961 | Austria | 423/341 |
| 544842 | 8/1957 | Canada | 423/341 |

Primary Examiner—G. L. Kaplan
Attorney, Agent, or Firm—Alan M. Doernberg; Gerhard H. Fuchs; Kenneth E. Stroup

[57] ABSTRACT

Silicon tetrafluoride gas is produced by reacting aqueous fluosilicic acid and concentrated sulfuric acid in a vertical column. The fluosilicic acid is fed to an intermediate point of the column and the sulfuric acid to the top of the column. Silicon dioxide, both dissolved and suspended, is fed with fluosilicic acid in some forms so as to produce a by-product acid substantially free of silicon and fluoride values.

10 Claims, 2 Drawing Figures

CONTINUOUS PRODUCTION OF SILICON TETRAFLUORIDE GAS IN A VERTICAL COLUMN

BACKGROUND OF THE INVENTION

The present invention relates to the production of silicon tetrafluoride gas, and especially to the production of such gas by reaction between concentrated sulfuric acid and aqueous fluosilicic acid.

Silicon tetrafluoride gas is an article of commerce useful for a variety of purposes, and especially as a chemical intermediate; most notably to make fumed silica (see U.S. Pat. No. 3,969,485 of Flemmert and the references cited therein) and to make silane (see U.S. Pat. No. 4,374,111 of Lefrancois). Generation of silicon tetrafluoride by mixing concentrated sulfuric acid with aqueous fluosilicic acid is disclosed in the above-referenced Flemmert patent, as well as in other references including U.S. Pat. Nos. 3,218,124 to Oakley, Jr et al. (1965) and 4,062,930 to Zawadzki et al. (1977). The general scheme used in these references is a stirred tank, into which both liquids are fed, and a column in which the product gas is scrubbed with concentrated sulfuric acid. The references differ as to whether the sulfuric acid passing through the column represents a portion or all of the concentrated sulfuric acid stream fed to the reactor. Certain of these references provide for silica (sand) feed to the reactor. Without any silica feed, the net reaction is

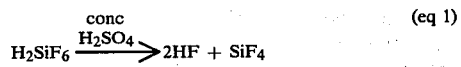
$$H_2SiF_6 \xrightarrow{\text{conc } H_2SO_4} 2HF + SiF_4 \quad \text{(eq 1)}$$

With silica fed in the proper amount, the net reaction is

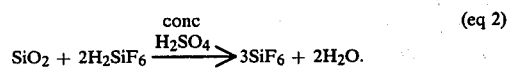
$$SiO_2 + 2H_2SiF_6 \xrightarrow{\text{conc } H_2SO_4} 3SiF_6 + 2H_2O. \quad \text{(eq 2)}$$

It is indicated that the by-product acid should have a concentration of about 72–78%. U.S. Pat. No. 4,062,930, col. 2, lines 29–32. In such processes, depending upon the reaction temperature and other factors (including silica feed) the by-product acid will have various levels of fluoride (as dissolved HF and/or dissolved $SiF_4$) and silicon (as $SiF_4$) values.

BRIEF DESCRIPTION OF THE INVENTION

Figure 1:
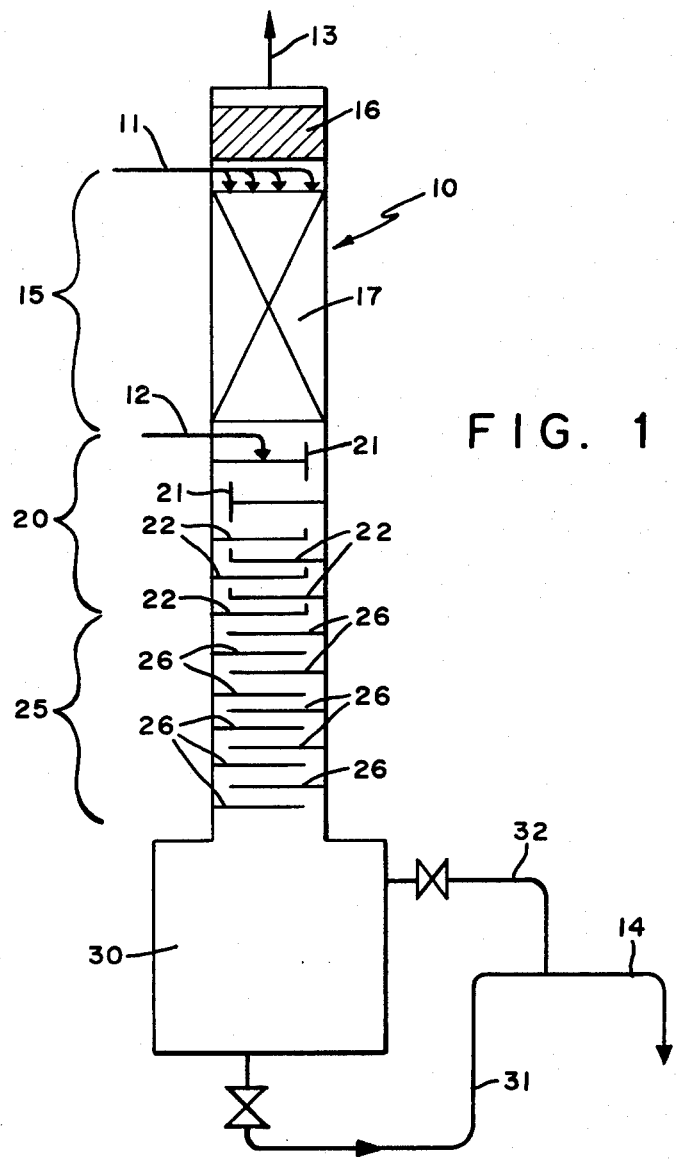
FIG. 1 is a schematic view of the process of the present invention.

It has been discovered that conducting the reaction between aqueous fluosilicic acid and concentrated sulfuric acid in a vertical column enables a reduction in reactor inventory and an improvement in reaction rate and yield. Silicon tetrafluoride gas of high purity can be produced, and the silicon values in the by-product acid streams can be lowered substantially. When silica is fed in proper amounts, by-product acid can be produced with low levels of both fluoride and silicon values, thus qualifying the by-product acid stream for a variety of uses for which the by-product acid stream of conventional silicon tetrafluoride processes would not qualify without further treatment.

Accordingly, the present invention includes a process for the continuous production of silicon tetrafluoride gas which comprises the steps:

(a) feeding to a vertical column at an intermediate feed point a first feed stream comprising aqueous fluosilicic acid of concentration at least about 130 g $H_2SiF_6$/L;

(b) feeding to an upper feed point of the vertical column adjacent the top of the column a second feed stream comprising sulfuric acid of concentration between about 80% and about 100%;

(c) operating said vertical column with sufficient effective plates between said intermediate feed point and said upper feed point and with sufficient feed rate of sulfuric acid to remove water vapor and HF from the gaseous $SiF_4$ generated in said column to a combined level below 0.1 volume %; and with sufficient effective plates below said intermediate feed point and sufficiently high temperature in said vertical column below the intermediate feed point and sufficient amounts of sulfuric acid fed relative to total water fed in said first and second feed streams to remove silicon values as Si from the liquid phase to levels below 0.1% by weight;

(d) recovering, as overhead, gaseous $SiF_4$ with combined water vapor and HF below 0.1 volume %; and (e) recovering as bottoms aqueous sulfuric acid with silicon values as Si below 0.1% by weight.

DETAILED DESCRIPTION OF THE INVENTION

The present reaction is conducted in a vertical column, as illustrated by the figures and described below in reference thereto. The column can be thought of as having three sections, the boundary between the upper and middle sections being defined by the feed point of aqueous fluosilicic acid. In the top section (the scrubbing section), below the upper feed point of concentrated sulfuric acid and above the intermediate feed point of fluosilicic acid, the product silicon tetrafluoride is scrubbed of impurities such as, especially, hydrogen fluoride and water vapor. In the middle section (the reaction section) including the point of fluosilicic acid introduction and in some cases several effective trays below that point, the present reaction occurs. In the lower section (gas disengagement section), below the middle section and down to the base of the column where the by-product acid stream (bottoms) is discharged, silicon tetrafluoride and, to a lesser extent, hydrogen fluoride, disengages from the liquid phase, preferably down to the equilibrium level for such gases in the by-product acid. In processes where no silica is fed to the column, a clear line of demarcation between the middle and lower sections is not required. If silica is fed with fluosilicic acid at the intermediate feed point, then the middle section can be considered those trays to which the silica is confined during operation; and the lower section can then be considered those trays (or effective trays) where only liquid and gas phases are present. The number of trays (or their equivalents) in each section, the design of the trays (or their equivalents), the general geometric configuration of the column, and other design features are discussed below in connection with the two forms of the invention: with and without silica feed.

One feed stream to the present column is aqueous fluosilicic acid, which is fed at an intermediate feed point. This stream will always contain water and fluosilicic acid ($H_2SiF_6$) and, if no other components are present, the fluosilicic acid may be present up to the saturation level, which is about 61 weight percent at 20° C. A common additional component in this stream is hydrogen fluoride, either because of recycle from a fumed silica flame reactor (as in the above Flemmert patent), because of evaporative concentration of fluosilicic acid and formation of the ternary azeotrope between water, fluosilicic and hydrogen fluoride (see U.S. Pat. No. 4,008,130 to Leathers et al.), or because HF was initially present in excess in the source of fluosilicic acid (e.g., in the recovery area of a phosphoric acid plant). Other materials may also be present in the aqueous stream, such as, for example, iron, phosphorus, sulfur, chlorine or calcium values. Such other impurities generally represent less than one weight percent of the aqueous fluosilicic acid stream.

Thus the aqueous fluosilicic acid stream will normally contain 15-35%, preferably about 20-30% fluosilic acid, on a weight basis as $$\frac{H_2SiF_6}{H_2O + H_2SiF_6}$$

While, in some forms, free HF may be absent, many forms of this feed stream will have 1-10% HF by weight. Other impurities will normally not exceed 1%, by weight of feed stream.

In forms where silica is fed to the column, the stoichiometric amount would be one mole $SiO_2$ for each two moles of $H_2SiF_6$ (eq 2) and one mol of $SiO_2$ for each four moles of excess HF:

$$SiO_2 + 4HF \rightarrow SiF_4 + 2H_2O \qquad (eq\ 3)$$

Because most fluosilicic acid is formed by absorption of crude $SiF_4$ in water (with silicon dioxide as a by-product), aqueous fluosilicic acid commonly contains dissolved silicon dioxide (as 10 to 30 mole % $SiO_2$ by moles of $H_2SiF_6$). Having, for example 23% silica is sometimes called having a "silica number" of 1.23 (1.23 actual moles of silicon value for each mole of silicon based upon $H_2SiF_6$ alone). It is preferred to use the stoichiometric amount of total silicon dioxide (dissolved and suspended on a time average basis, but some variation can occur at any particular time, either because the silica is added intermittently or non-uniformly, because the fluosilicic acid concentration varies over time, or because the HF concentration in the fluosilicic acid varies over time. By maintaining some silica inventory in the column, and cutting back on silica feed when this inventory exceeds a desired level, the proper stoichiometric amount can be maintained.

Temperature of the fluosilicic acid feed stream is not critical, and can be room temperature or ambient temperature if the acid feed (and other factors such as insulation on the column) are sufficient to achieve the desired temperature in the reaction zone (at least about 80° C., and preferably between about 90° and about 110° C.). Some preheating of the aqueous fluosilicic stream can be performed, if convenient; but feed temperatures causing excessive vapor formation in this feed prior to reaching the column should be avoided.

Concentrated sulfuric acid feed to the top of the column may be at any concentration between about 80% and about 100% but is preferably between about 90 and about 99%, and is more preferably between about 95 and about 99%, depending upon availability. Temperature of this stream is not critical, with 15°-40° C. acid being preferred. There should not, however, be a combination of sulfuric concentration and temperature which causes significant sulfur dioxide or sulfur trioxide vapor pressure at the top of the column, and appropriate temperatures to avoid this for any particular acid feed would be well known or determinable by routine experimentation. The feed rate of sulfuric acid should be that producing a weight ratio of $$\frac{H_2SO_4}{H_2O + H_2SO_4}$$

in the by-product acid bottoms at least 60%, and preferably between about 70% and about 80%. The water used for this calculation will be primarily the water content of the aqueous fluosilicic acid feed stream, and to a lesser extent, the water of the sulfuric acid feed stream, but should also include the by-product water of equation 2 and equation 3 if silica is used.

The vertical column should be designed and operated in the reaction zone to effect good mixing between the two liquid streams: aqueous fluosilicic acid being fed at the intermediate feed point and concentrated sulfuric acid coming from the upper section of the column. Mixing trays having downcomers (at least at the feed tray) are used at the point of fluosilicic acid feed. When silica is fed, modified trays having a hold-up capacity for slurry and small sieve openings for gas to rise should be used below the mixing tray or trays. Examples of such modified trays include seive trays, bubble-cap trays and valve trays. Exceeding the solids inventory in the column would cause solids to be present in an effluent stream which would be easily detected by suitable optical instruments such as a turbidity meter, preferably of the forward light scattering type. In such case, the silica feed rate would be reduced.

To the extent that the acid-water balance and feed temperatures are insufficient to maintain the desired temperature in the reaction zone (at least about 80° C., and preferably between about 90° C. and about 110° C.), indirect heat exchange (such as steam jacketing this section of the column) may be used.

The upper section of the vertical column should be designed for good gas-liquid contact and, therefore, may be a column filled with trays, packing, or any other equipment used for absorption. The temperature in this upper section is not critical and, in general, will be substantially lower than in the reaction zone and be substantially the same as the temperature of the sulfuric acid feed stream. Contact time and especially sulfuric acid flux should be sufficient to lower water vapor and especially hydrogen fluoride concentration in the vapor phase to below 0.1 volume percent, preferably below 0.01 volume percent (100 ppm) and more preferably below 0.005 volume percent (50 ppm). Determination of the HF concentration in silica tetrafluoride gas can be made by infrared spectroscopy. It is contemplated to have a demister or similar structure above the sulfuric acid feedpoint, as shown in the Figures.

The lower section of the column should be designed for sufficient turbulence in downcoming liquid to permit HF and $SiF_4$ to evaporate to equilibrium levels. Simple cascade trays are preferred in this section, although sieve or bubble trays or packed sections may be used. If no silica is fed into the reaction zone, substantial HF will remain in the by-product acid. If silica is fed into proper amounts, complete reaction will cause substantially only $SiF_4$ to be present as dissolved gas in the liquid phase in this lower zone (some dissolved or suspended silica may be present). The number of trays (or effective trays if other types of column are used) required for disengagement may be greater in the silica feed case; however, levels of both fluoride and silicon values obtainable are lower in the silica feed case. While not wishing to be tied to any particular theory, we postulate that the equilibrium concentration of $SiF_4$ in this phase (e.g., 70% aqueous sulfuric acid at 90° C.) is lower in the absence of HF than in the presence of substantial amounts of HF. The limited data available, however, does not prove this postulate since minor differences existed in both temperature (95° C. vs. 92° C.) and sulfuric acid concentration (75% vs. 70%) in Example 3 vs. Example 1 below; and any one of these three differences (HF concentration, temperature and sulfuric acid concentration) or any combination of them may have caused the reduction in silicon values in the by-product acid in Example 3.

Modification of the above process by feeding some of the sulfuric acid to the mixing tray and/or by feeding silica to the mixing tray separate from the aqueous fluosilicic acid feed (e.g., suspended in sulfuric acid) are contemplated, especially when using coarse sand.

FIG. 1 illustrates the operation of preferred embodiments of the present invention. A vertical column 10 is shown into which are fed a sulfuric acid stream 11 near the top and an aqueous fluosilicic acid stream near the middle, and from which are withdrawn silicon tetrafluoride vapor 13 at the top and a by-product acid stream 14 from the bottom (through a holding tank 30 as described below). The column can be considered as having an upper section 15 above the feedpoint of stream 12, a middle section 20 including and below the feed point of stream 12 and a lower section 25 below middle section 20. In addition, a demister pad 16 is located above the feedpoint of sulfuric acid stream 11 and below the exit of silicon tetrafluoride stream 13.

While various types of trays or packing may be used in each of sections 15, 20 and 25, preferred equipment is as described below. Upper section 15 is designed for scrubbing product vapor with incoming concentrated sulfuric acid and, accordingly, may be any hardware providing for good liquid/gas contacting. A section of packing 17 is shown in section 15 which should be of a fluoropolymer material (e.g. polytetrafluoroethylene) resistant to both strong sulfuric acid and HF.

The reaction section 20 should contain trays providing good mixing of two liquids (downcoming sulfuric acid and aqueous fluosilicic acid from feed stream 12). A pair of mixing trays 21 are illustrated at and immediately below the feedpoint of stream 12. These trays 21 are preferably seive trays, which have weirs forming a liquid (or liquid/solid) hold-up area, small apertures in the vertical portions for up-flowing vapor and downcomers for overflowing liquid (or liquid mixed with silica). Bubble cap trays may also be used in place of the illustrated seive trays 21. Below trays 21, but also in middle section 20, are a series of trays 22 which can be cascade trays with weirs, so as to provide additional hold-up for liquid (or liquid with a decreasing amount of silica on successively lower trays). While heating is normally not required to achieve the desired 90°–110° C. temperature in middle section 20, effective insulation is normally necessary, at least for columns having an inside diameter less than 15 cm.

The lower section 25 should be designed for disengagement of dissolved gases (HF and $SiF_4$) in downcoming liquid. A series of simple cascade trays 26 are preferred for this purpose, with large passages provided for vapor, once disengaged, to pass up the column into the reaction zone (section 20). As described in the examples below, a clear line of demarcation between section 20 and section 25 is not required, and the lowermost of trays 22 may serve for disengagement under some operating conditions, while the uppermost of trays 26 may serve for reaction under other operating conditions.

A holding tank 30 is provided below lower section 26 to receive by-product acid. Except under extraordinary operating conditions, neither reaction nor disengagement will occur to a significant extent in holding tank 30 and, accordingly, neither the temperature, the capacity nor the residence time of liquid in holding tank 30 are critical to the operation of the present process. Liquid may be removed from holding tank 30 in a lower outlet 31 (fitted with a valve) or may overflow into an overflow line 32, passing in either event by gravity or pressure within the system out through line 14 to a cooler (not shown). It is preferred not to provide a pump in any of these three lines 31, 32 and 14. When liquid is being removed through line 31, line 32 may (optionally) be left open to permit any entrained gas bubbles to return to holding tank 32. Liquid will normally overflow into line 32 only when the valve in line 31 is closed. This latter arrangement may be used if excess silica is being fed through line 12 beyond the stoichiometric amount. In such event, liquid may be removed in line 32 while permitting solids to build up in a modified holding tank 30 designed for liquid/solid separation. Periodically, slurry would be removed through line 31 and filtered to recover solids.

The size of column 10 and of the elements thereof can be scaled to produce a variety of rates of silicon tetrafluoride gas. In embodiments without silica feed, approximatly 5 effective trays in upper section 15, approximately 2 effective trays in middle section 20 and approximately 10 effective trays in lower section 25 should suffice. Residence time in holding tank 30 may vary from essentially none to 60 minutes or more. In embodiments with silica feed, the above parameters apply except that at least 10 effective trays in middle section 20 and at least one minute liquid residence time (for fine sand, more may be required for coarser sand) in section 20 are preferably provided to assure both adequate reaction and essentially complete disengagement.

EXAMPLES

Figure 2:
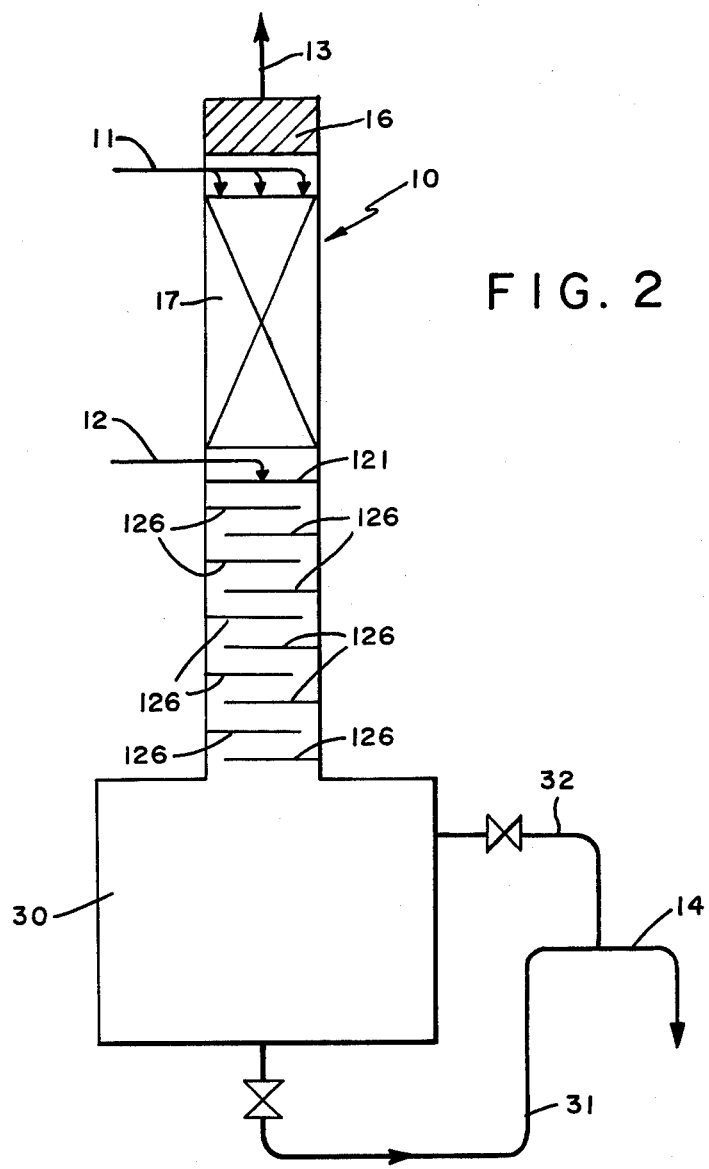
FIG. 2 is a similar view of the system used in the Examples.

The apparatus used in the following three examples was as shown in FIG. 2, wherein most elements are identical in structure and operation to those described above in reference to FIG. 1. Column 10 was 7 feet (2.1 m) in length, two inches (5.08 cm) outside diameter and 1.843 inches (4.68 cm) inside diameter, and was constructed of carbon steel, lined on the inside by polytetrafluorethylene (PTFE). Mist eliminator 16 was 3 inches (8 cm) high; and packed section 17 was 5 feet (1.52 m) high. Packed section 17 contained three-eighths inch (0.95 cm) diameter solid PTFE Raschig rings on a perforated PTFE support plate. Six inches (15 cm) below the support plate was a PTFE mixing tray 121 onto which aqueous fluosilic acid stream 12 was fed. Below sieve tray 121 were ten cascade trays 126 spaced at 1.5 inch (3.8 cm) intervals. Below the column 10 was a thirty gallon (114 L) capacity holding tank 30 equipped with bottom discharge line 31 and overflow line 32, both connected to line 14.

EXAMPLE 1

To the apparatus illustrated in FIG. 2 and described immediately above was fed 90 pounds per hour (41 kg/h) of 98% sulfuric acid in stream 11 at 16±2° C. and 50 pounds per hour (23 kg/h) of 25% (aqueous) $H_2SiF_6$ (containing about 23% $SiO_2$ by moles of $H_2SiF_6$) solution through stream 12 at 30±6° C. The maximum reaction temperature in the column at steady state was 92° C. (measured at the upper level in holding tank 30) and the run lasted four and one-quarter hours. The by-product acid (stream 14) was 68% based upon weight balances:

$$\frac{\text{sulfuric fed}}{\text{by-product acid produced}}$$

and 70.3% based upon wet analysis (titration for total acid). Analysis of the waste acid by atomic absorption showed 0.26 weight % (2600 ppm) Si. Based on the silicon values in streams 12 and 14, the $SiF_4$ produced amounted to 95.4% of the feed, by moles of Si. At different times in the run, by-product acid was removed through bottom exit 31 and overflow line 32 (by closing the valve in line 31). In neither case was gas evolution seen in the by-product acid: therefore complete disengagement had occurred on trays 126.

EXAMPLE 2

Example 1 was repeated using 100 pounds per hour (45 kg/h) 98% sulfuric acid in stream 11 at 18°–20° C. and 50 pounds per hour (23 kg/h) 25% aqueous fluosilicic acid (containing about 23% dissolved $SiO_2$ by moles $H_2SiF_6$) in stream 12 at 30±6° C. The peak operating temperature at steady-state was 93° C. The total recovered by-product acid assayed 75% $H_2SO_4$ by titration and 0.027% (270 ppm) Si by atomic absorption. This represents a 1.5% yield loss (by moles Si in feed stream 12). Of the 98.5% silicon tetrafluoride presumed to be produced, 83% was collected during 3 hours, 41 minutes of the 4 hours, 20 minutes run.

EXAMPLE 3

The apparatus of FIG. 2, described above, was fed with 100 pounds per hour (45 kg/h) of 98% sulfuric acid through stream 11 at 10°–13° C. and 42 pounds per hour (19 kg/h) of 25% aqueous fluosilicic acid containing 2.0% (by weight) of fine silica (a product of PPG Industries sold as HI-SIL-233) through stream 12 at 4°–7° C. The peak reaction temperature at steady-state was 95° C. and the run lasted five and three-quarter hours. By weight balance, the by-product acid was 75.2% $H_2SO_4$; by titration it was 75.3% $H_2SO_4$. Atomic absorption showed 56 ppm silicon in the waste acid, representing a presumed potential yield of 99.95% $SiF_4$, based on moles of both $H_2SiF_6$ and $SiO_2$ fed. Some degassing of the by-product waste acid leaving holding tank 30 through line 31 was detected, however; therefore entrained gas was disengaged in exit line 31 and returned via line 32. This degassing was attributed to insufficient reaction trays in this apparatus for aqueous feed containing solid silica.

We claim:
1. A process for the continuous production of silicon tetrafluoride gas which comprises the steps:
   (a) feeding to a vertical column at an intermediate feed point a first feed stream comprising aqueous fluosilicic acid of concentration at least about 130 g $H_2SiF_6$/L;
   (b) feeding to an upper feed point of the vertical column adjacent the top of the column a second feed stream comprising sulfuric acid of concentration between about 80% and about 100%;
   (c) operating said vertical column with sufficient effective plates between said intermediate feed point and said upper feed point and with sufficient feed rate of sulfuric acid to remove water vapor and HF from the gaseous $SiF_4$ generated in said column to a combined level below 0.1 volume percent; and with sufficient effective plates below said intermediate feed point and sufficiently high temperature in said column and sufficient amounts of sulfuric acid fed relative to total water fed in said first and second feed streams to remove silicon values as Si from the liquid phase to levels below 0.1% by weight;
   (d) recovering, as overhead, gaseous $SiF_4$ with combined water vapor and HF below 0.1 volume %; and
   (e) recovering as bottoms aqueous sulfuric acid with silicon values as Si below 0.1% by weight.

2. The process of claim 1 wherein said vertical column is a tray column below said intermediate feed point.

3. The process of claim 1 wherein the vertical column is maintained at peak temperatures between about 90° C. and about 110° C. below said intermediate feed point.

4. The process of claim 1 wherein the second feed stream is sulfuric acid of concentration between about 90% to about 100%.

5. The process of claim 4 wherein the first feed stream is fluosilicic acid of concentration between about 20% and about 30%.

6. The process of claim 5 wherein feed ratio of the second feed stream to the first feed stream is sufficient to produce a bottoms stream of at least 60% sulfuric acid measured as:

$$\frac{[H_2SO_4]}{[H_2O] + [H_2SO_4]}$$

7. The process of claim 6 wherein the bottoms stream is between about 70 and about 80% sulfuric acid.

8. The process of claim 4 wherein the first feedstream is fluosilicic acid of concentration between about 20% and about 30% in which is suspended silicon dioxide.

9. The process of claim 8 wherein the silicon dioxide is in the form of sand.

10. The process of claim 8 wherein, on a molar basis, the silicon dioxide fed is between about 40 and about 50% of the fluosilicic acid fed.

* * * * *